United States Patent
Kuo

(10) Patent No.: US 7,403,313 B2
(45) Date of Patent: Jul. 22, 2008

(54) AUTOMATIC SCANNING PARAMETER SETTING DEVICE AND METHOD

(75) Inventor: Shih-Zheng Kuo, Taipei Hsien (TW)

(73) Assignee: Transpacific IP, Ltd., Taipei (TW)

( * ) Notice: Subject to any disclaimer, the term of this patent is extended or adjusted under 35 U.S.C. 154(b) by 987 days.

(21) Appl. No.: 09/967,715

(22) Filed: Sep. 27, 2001

(65) Prior Publication Data
US 2003/0058484 A1    Mar. 27, 2003

(51) Int. Cl.
*H04N 1/04* (2006.01)
*H04N 1/32* (2006.01)
*H04N 1/46* (2006.01)

(52) U.S. Cl. .................... 358/486; 358/474; 358/444; 358/448; 358/442; 358/468; 358/505

(58) Field of Classification Search .............. 358/474, 358/486, 497, 494, 442, 468, 505, 401, 501, 358/444, 448, 488, 473; 382/317–319, 312, 382/313
See application file for complete search history.

(56) References Cited

U.S. PATENT DOCUMENTS

| | | | | |
|---|---|---|---|---|
| 5,251,297 A | * | 10/1993 | Takayanagi | 345/530 |
| 5,659,164 A | * | 8/1997 | Schmid et al. | 235/375 |
| 6,028,966 A | * | 2/2000 | Hashimoto | 382/262 |
| 6,236,770 B1 | * | 5/2001 | Hsieh et al. | 382/312 |
| 6,298,176 B2 | * | 10/2001 | Longacre et al. | 382/313 |
| 6,577,409 B1 | * | 6/2003 | Barker et al. | 358/468 |
| 6,646,765 B1 | * | 11/2003 | Barker et al. | 358/474 |
| 6,650,442 B1 | * | 11/2003 | Chiu | 358/474 |
| 6,778,288 B1 | * | 8/2004 | Ogaki et al. | 358/1.15 |
| 6,795,210 B1 | * | 9/2004 | Fujiwara | 358/1.18 |
| 7,002,712 B2 | * | 2/2006 | Barker et al. | 358/474 |

FOREIGN PATENT DOCUMENTS

GB    2350006    11/2000

* cited by examiner

*Primary Examiner*—Cheukfan Lee
(74) *Attorney, Agent, or Firm*—Stolowitz Ford Cowger LLP

(57) ABSTRACT

An automatic scanning parameter setting device and method. The automatic scanning parameter setting device is a scanner that automatically sets the scanning parameters of a plurality of scan images so that scanning can be conducted in batches. The automatic scanning parameter setting device includes an image input device, an analysis device and a control unit. The image input device is attached to the scanner for inputting a plurality of scan images. A portion of the scan images contains a set parameter format. The set parameter format contains a plurality of scanning parameter values. The analysis device performs an analysis of the scan images containing recorded scan parameter values. The control unit uses the analyzed scanning parameter values to conduct a scanning parameter setting operation on the scan images having recorded scanning parameter values as well as the ordered scan images after the scan images with recorded scan parameter values but without recorded scan parameter values.

30 Claims, 4 Drawing Sheets

```
Begin:
    Scan mode : color ;
    Resolution : 600 ;
    Xstart : 0 ;
    Ystart : 0 ;
    Width : 1200 ;
    Length : 2400 ;
    Highlight : 255 ;
    Shadow : 0 ;
    Target path : c:\vistascan\image ;
End
```

```
Begin:
    Scan mode : color ;
    Resolution : 600 ;

Xstart : 0 ;
    Ystart : 0 ;

Width : 1200 ;
    Length : 2400 ;
    Highlight : 255 ;
    Shadow : 0 ;

Target path :  c:\vistascan\image ;
End
```

FIG. 4

AUTOMATIC SCANNING PARAMETER SETTING DEVICE AND METHOD

BACKGROUND OF THE INVENTION

1. Field of Invention

The present invention relates to an automatic scanning parameter setting device and method. More particularly, the present invention relates to a device and related method of extracting scanning parameters from a scan image and setting the scanning parameters automatically.

2. Description of Related Art

Nowadays, most scanners have an automatic document feeder. If the images on a whole pile of papers employ identical scanning parameters, scanning can be conducted automatically and continuously by putting the whole pile of papers into the automatic document feeder.

However, if some of the scan images that a stack of papers contains need to use different scanning parameters, a user must standby the scanner and host system for inputting the non-conforming scanning parameters so that images are scanned using optimal parameters.

When a user performs a parameter adjustment, all current scanning operations must be stopped. All scanning must stop to await the completion of the parameter-setting operation because the scanner needs to use the newly set scanning parameters Due to the need for changing scanning parameters, users have to stay besides the host system even when the scanner has an associated automatic document feeder capable of automatic document feeding.

SUMMARY OF THE INVENTION

Accordingly, one object of the present invention is to provide a device capable of setting scanning parameters automatically. The parameter setting device is a scanner having an automatic document feeder. The device is capable of automatic sorting and setting of parameters in a pile of scan papers such that the scanner can directly change scanning parameters during a multiple image scanning operation without having to set the parameters through a complicated interface via the host computer. Furthermore, there is no need to stop the scanning operation while parameters are set.

To achieve these and other advantages and in accordance with the purpose of the invention, as embodied and broadly described herein, the invention provides an automatic scanning parameter setting device. The automatic parameter scanning device includes an image input device, an analysis device and a control device.

The image input device is attached to the scanner for inputting a multiple of scan images. A portion of the scan images has a specified parameter setting format. The parameter setting format includes a plurality of scanning parameter values.

The analysis device performs a scanning parameter value analysis for those portions of the scan images having parameter setting format. The control unit utilizes the analyzed scan parameter values to conduct a scanning parameter setting operation on the scan images with recorded scan parameter values as well as a portion of the scan image ordered after the scan image with recorded scanning parameter value but without recorded scan parameter value.

This invention also provides an automatic scanning parameter setting device for extracting scanning parameters from a multiple of scan images that need to be sorted before scanning. The automatic scanning parameter setting device is a host system connected to an image input device. The image input device feeds in a multiple of scan images to the host system. The automatic scanning parameter setting device includes an analysis device and a control unit.

The analysis device performs a scanning parameter analysis of a portion of the scan images. A portion of the scan images has the specified set parameter format. The set parameter format of these scan images is used for registering scan parameter values.

The control unit utilizes the analyzed scan parameter values to conduct a scanning parameter setting operation on the scan images with recorded scan parameter values as well as a portion of the scan image ordered after the scan image with recorded scanning parameter value but without recorded scan parameter value.

This invention also provides a method of automatically setting the scanning parameters related to extracting scanning parameters from a multiple of scan images that needs to be sorted before scanning.

The automatic scanning parameter setting method includes the following steps. First, specific set parameter formats are inserted into the portion of the scan images that needs to be scanned using different scanning parameter values. The set parameter format includes the scan parameter values needed by the scan images.

Thereafter, a scanning operation is conducted. During the scanning operation, the scan images are looked at to find any scanning parameter values. If scan parameter values are found, the scan parameter value is analyzed. Finally, the scan image is scanned using these scan parameter values.

However, if a portion of the scan images has no recorded scan parameter value but is ordered after the scan images with recorded scan parameter values, these scan images are scanned according to the scan parameter values.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 4 is a mnemonic program for setting parameter format.

DESCRIPTION OF THE PREFERRED EMBODIMENTS

Figure 1:
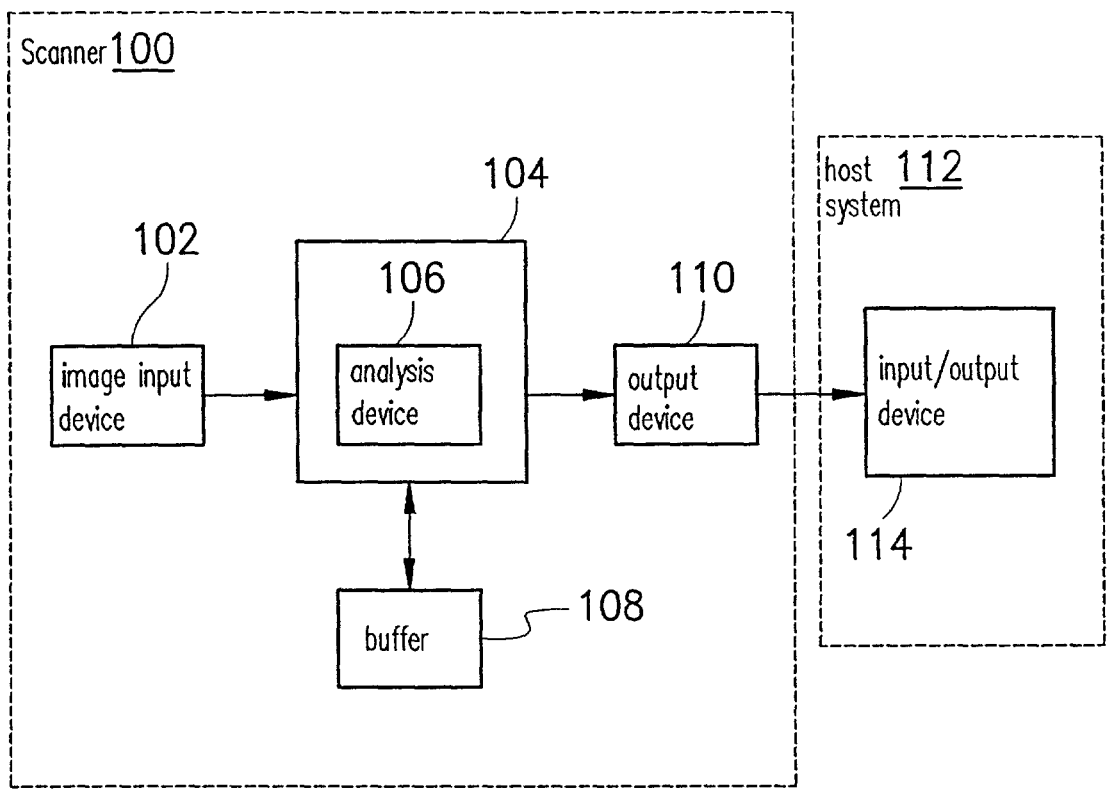
FIG. 1 is a schematic block diagram of an automatic scanning parameter setting device according to a first embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram of an automatic scanning parameter setting device according to a first embodiment of this invention. This invention is related to a device for extracting scan parameter values from a batch of scan images and setting these scan images before conducting a scanning operation. The device for setting scanning parameters automatically is a type of scanner having an automatic document feeder.

The automatic scanning parameter setting device includes an image input device 102, an analysis device 106 and a control unit 104. The image input device 102 such as an automatic document feeder is mounted on the scanner for inputting scanning images. A portion of the scan images has a specified set parameter format that includes a plurality of scanning parameter values such as scan mode of an image, resolution, initial position value, image size, color brightness and target parameters of the object image.

FIG. 4 is a mnemonic program for setting parameter format. The scanner sets parameters according to the set parameter format. For example, the scan mode for scanning an image is color, resolution is 600 dpi, the initial position of the image is at the zero point of the x-axis and the y-axis, the image has a width of 1200 and a length of 2400, the color brightness is at a highlight value 255, shadow value is zero and target parameter of the scan object is target path, and the location to scan the image to is c:\vistascan\image.

The scan parameter values are recorded on the scan images. Hence, when the image input device 102 inputs the scan images with the recorded scan parameters into the image input device 102, the analysis device 106 inside the scanner 100 performs a scanning parameter analysis of the scan images.

The analysis device 106 in this embodiment resides within the control unit 104. The type of analysis includes identification and comparison of all scan images containing recorded scanning parameter values. Identification and comparison operations refer to the operation by identification software on a stream of scanned text. The stream of scanned text is grafted and compared with text stored inside a pre-existing library so that text on the scan image can be recognized. In this invention, the analysis device 106 is the place for identifying scan parameter values from the images.

The control unit 104 utilizes the analyzed scan parameter values to conduct a parameter setting operation on the scan images with scan parameter values as well as a portion of the scan images ordered after the scan images but without set parameter format.

If a scan image has a set parameter format shown in FIG. 4, the control unit 104 will utilize the identified scan parameter values to set the scan parameters of this image after performing an analysis inside the analysis device 106. When the automatic document feeder transfers the next scan image and finds this image does not have set parameter format after an analysis by the analysis device 106, this indicates the user does not want any changes of the scan parameter values in the next image. Hence, the control unit 104 will use the preset scan parameter values to set the scan parameters.

In addition, because only a portion of the scan images among a pile has set parameter format, the analysis device 106 is not required to conduct a scan parameter value identification operation for each scan image. Therefore, the set parameter format must have a control label for informing the control unit 106 about the presence or the absence of recorded scan parameter values in an image.

As shown in FIG. 4, the Begin label at the very beginning of the program informs the control unit 106 about the initialization of scan parameter analysis by the analysis device 104. Similarly, the End label at the end of the program informs the control unit 106 about the completion of the scan parameter analysis. The control unit 106 may utilize the analyzed scan parameter values between the initial label and the end label to set the parameters of scan images after the set parameter format.

Hence, the analysis device 104, besides analyzing scan parameter values, must also decide beforehand whether the scan image contains scan parameter values or not. New scanning parameters for processing a scan image are determined according the presence or absence of an initialization label.

As shown in FIG. 1, the automatic scanning parameter setting device further includes a buffer 108 and an output device 110. The buffer 108 holds scanning parameter values of images not yet analyzed. In other words, after the image input device 102 receives input scan images, the control unit 104 will redirect the input images to the buffer 108 for temporary storage. Afterwards, the control unit 104 controls both the redirection of input images to the buffer 108 and the retrieval of images from the buffer 108 to the analysis device 106 for scanning parameter analysis. If the analysis device 106 finds no initializing label in the image, the control unit 104 can directly transfer subsequent image data to the output device 110 so that the output device 110 can re-direct the scan image data to a host system 112. From the input/output device 114 inside the host system 112, image data are transmitted to the appropriate image storage device according to target parameter values.

FIG. 1 also illustrates another embodiment of this invention. The scanner 100 device also includes the aforementioned image input device 102, analysis device 106 and control unit 104. However, the buffer 108 within the scanner 100 is a device for holding analyzed scan parameter values from the analysis device 106. In other words, after scan images are input into the image input device 102, the analysis device 106 first analyzes the input images to check if they contain any scanning parameter values. If there is, the scanning parameter values are stored in the buffer 108 waiting for the completion of scanning parameter analysis by the analysis device 106. After scanning parameter analysis, the control unit 104 sets the scanning parameters of the currently scanned image according to the scan parameter values stored inside the buffer 108.

If the analysis device 106 finds no scanning parameter value in the input image, the input image is not stored in the buffer 108. The control unit 104 directly sets the scanning parameter values of the image.

The control unit 104 in the aforementioned embodiment includes an application specific integrated circuit (ASIC). The ASIC is a control unit inside the scanner similar to the CPU inside a computer.

Figure 2:
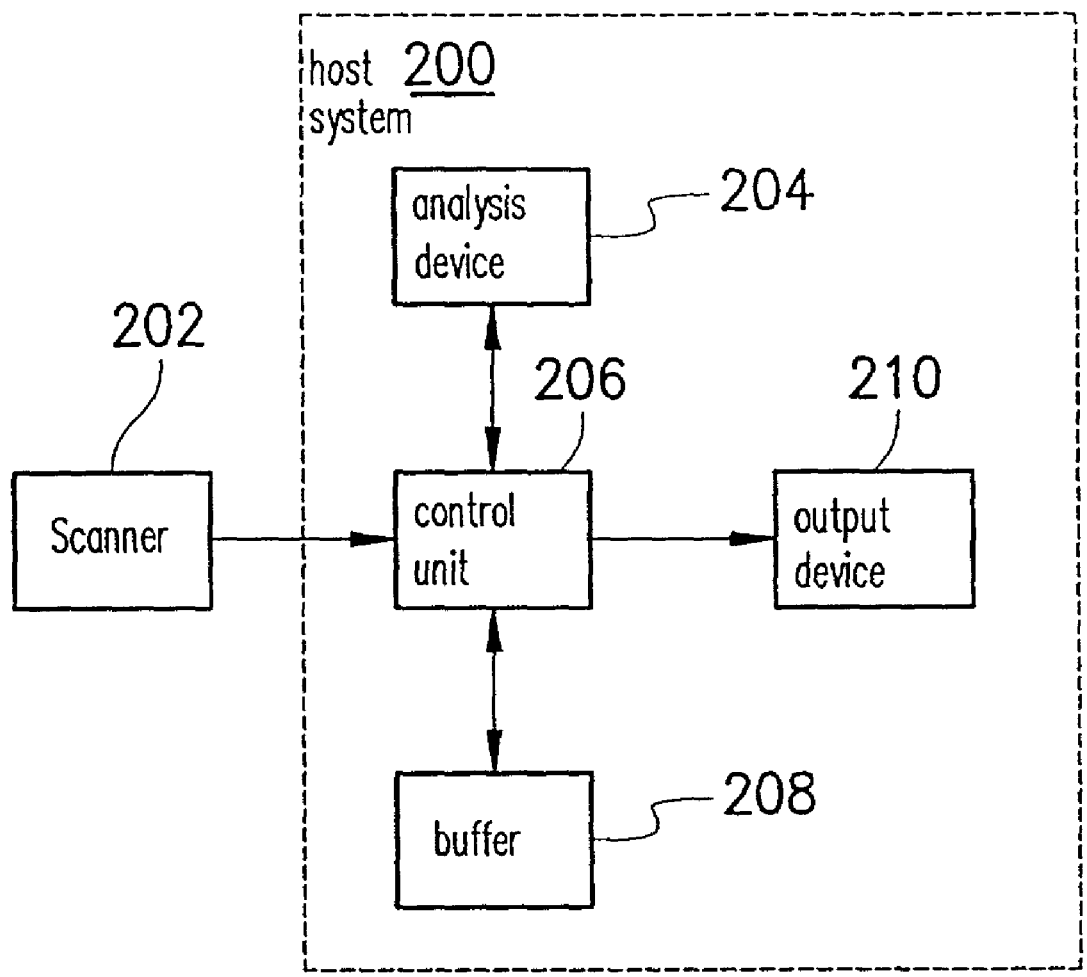
FIG. 2 is a schematic block diagram of an automatic scanning parameter setting device according to a second embodiment of this invention.

FIG. 2 is a schematic block diagram of an automatic scanning parameter setting device according to a second embodiment of this invention. As shown in FIG. 2, the automatic scanning parameter setting device is a host system 200. The host system 200 is connected to an image input device. The image input device is capable of submitting a multiple of scan images into the host system 200. In this second embodiment, the image input device includes a scanner 202 having an automatic document feeder, for example. The auto document feeder of this type of scanner can hold a stack of scan images. The automatic document feeder can move the scan image into the host system 200 one at a time.

The automatic scanning parameter setting device includes an analysis device 204 and a control unit 206. The analysis device 204 performs a scanning parameter analysis on a portion of the scan images that has a specified set parameter format as shown in FIG. 4. The set parameter format includes, for example, scan mode of images, resolution, initial position values, image sizes, color brightness and scan parameter values of target parameters.

The control unit 206 utilizes the analyzed scan parameter values to conduct a parameter setting operation on the scan images with scan parameter values as well as a portion of the scan images ordered after the scan images but without set parameter format.

The analysis device 204 is connected to the control unit 206 to determine which scan images contain scan parameter values and which scan images do not have scan parameter values and perform a scanning parameter analysis on those scan images having recorded scan parameter values. The method of analysis includes identification and comparison.

To determine if a scan image contains recorded scan image parameters, the analysis device 204 looks for a starting label such as Begin in the set parameter format shown in FIG. 4. In other words, the analysis device 204 decides whether a particular scan image has recorded scan parameter values or not according to the presence or absence of an initial label.

When the analysis device 204 finds an initial label, the analysis device 204 informs the control unit 206 about the on-going scanning parameter analysis. As the analysis device 204 reaches an end label, for example, the End label in FIG. 4, the analysis device 204 will also inform the control unit 206 about the successful completion of the scanning parameter analysis. The control unit 206 uses the analyzed scanning parameter values between the initial label and the end label to set the scan parameters of images coming after the set parameter format.

In addition, the automatic scanning parameter setting device or host system 200 further includes a buffer 208. The buffer 208 is a place for temporarily holding scan images whose scanning parameters have not yet been analyzed. In other words, when scan images are sent into the scanner 202, the control unit 206 redirects the incoming image to the buffer 208. Thereafter, the control unit 206 not only redirects the input image to the buffer 208, the control unit 208 also retrieves images from the buffer 208 to the analysis device 204 for scanning parameter analysis. If the analysis device 204 finds no initial label in a particular image, the control unit 206 will transfer the received image to a target position according to a target path.

FIG. 2 also illustrates an alternative embodiment of this invention. The host system 200 also includes the aforementioned analysis device 204 and control unit 206. However, the buffer 208 within the host system 200 is a device for holding analyzed scan parameter values from the analysis device 204. In other words, after scan images are input into the scanner 202, the analysis device 204 first analyzes the input images to check if they contain any scanning parameter values. If there is, the scanning parameter values are stored in the buffer 208 waiting for the completion of scanning parameter analysis by the analysis device 204. After scanning parameter analysis, the control unit 206 sets the scanning parameters of the currently scanned image according to the scan parameter values stored inside the buffer 208.

If the analysis device 204 finds no scanning parameter value in the input image, the input image is not stored in the buffer 208. The control unit 206 directly sets the scanning parameter values of the image.

The control unit 206 in FIG. 2 is the central processing unit (CPU) of the host system 200.

Furthermore, the aforementioned scanner is a type of scanner with an automatic document feeder. However, other types of scanners that utilize the recorded scan parameter values on the scan images and set the scanning parameters of scan images during a scanning operation are also within the scope of this invention.

Figure 3:
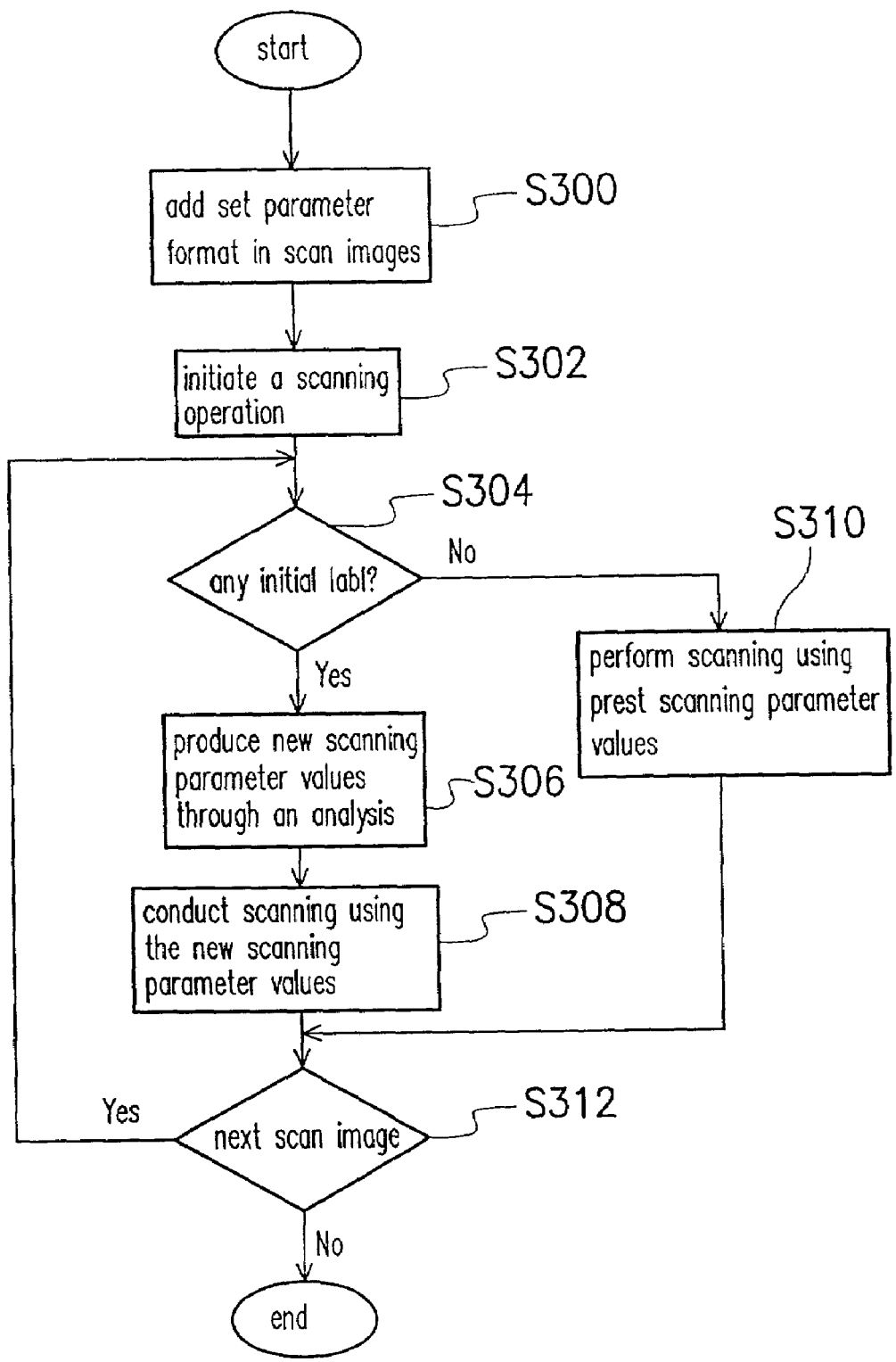
FIG. 3 is a flow diagram showing, the steps for automatically setting the scanning parameters needed for a scanning operation according to this invention.

FIG. 3 is a flow diagram showing the steps for automatically setting the scanning parameters needed for a scanning operation according to this invention. The method includes extracting scan parameter values and automatically sorting out scan images for batch processing.

In step s300, a specified set parameter format is inserted into a portion of the scan images requiring a set of different scan parameter values. FIG. 4 shows a type of set parameter format. The set parameter format includes various scan parameter values attributed to a scan image including, for example, scan mode of an image, resolution, initial position value, image size, color brightness and target parameter value for scan parameter. The set parameter format further includes an initial label Begin and an end label End.

The scanning operation begins in step s302. The initial label is searched in step s304. The initial label is used for determining if the scan image contains recorded scan parameter values or not. If an initial label is found in step s304, step s306 is executed to find out what these scanning parameters are until the end label is encountered. In step s308, these scan parameter values are used to scan the current image. On the other hand, if no initial label is found in step s304, this indicates the image does not have any recorded scanning parameter values. Hence, in step s310, pre-determined scanning parameter values are used to carry out the scanning operation.

If an initial label is found in step s304, this indicates that the currently scanned image needs to have new scanning parameter values. This also means that the originally preset scanning parameter values need to be adjusted to a new set of scanning 14) parameter values. After scanning the current image, if there are some more images waiting to be scanned in step s312 and these images do not have any scanning parameter values, the scanning parameter values in a previous scan image can be used as the scan parameter values.

In conclusion, one major advantage of this invention is the automatic re-setting of the scanning parameter values. There is no need to set up a complicated interface with a host system. As long as scanning parameter values are inserted into scan images, the invention can automatically identify and extract the scanning parameter values from the scan image so that the scanning parameter values can be used to perform the scanning operation. Furthermore, there is no need to stop the scanning operation when the scanning parameters are set.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system, comprising:
    an analysis device adapted to analyze one or more scan images to identify one or more scan parameter values included in at least a portion of the scan images and compare the identified scan parameter values to a library of scan parameter values to obtain one or more scanner settings corresponding with the identified scan parameter values, wherein the scan images include a specified set parameter format having an initial label and an end label and the scanning parameter values are located between the initial label and the end label; and a control unit electrically coupled to the analysis device and adapted to provide said scanner settings to a scanning device.

2. The system of claim 1, further comprising a buffer.

3. The system of claim 2, wherein the buffer is adapted to store the scan images, and wherein said analysis device is adapted to analyze the scan images stored in said buffer.

4. The system of claim 2, wherein the buffer is adapted to store the identified scan parameter values.

5. The system of claim 1, wherein the analysis device is integrated with to the control unit.

6. The system of claim 1, wherein the analysis device and the control unit are integrated with the scanning device.

7. The system of claim 6, further comprising an automatic document feeder integrated with the scanning device.

8. The system of claim 1, wherein the control unit comprises an application specific integrated circuit.

9. The system of claim 1, wherein text characters are used to represent at least one selected from the group including the initial label, the end label, and the scan parameter values.

10. The system of claim 1, wherein the analysis device is adapted to determine whether a particular scan image includes the scan parameter values and is further adapted to indicate the presence of the scan parameter values to the control unit.

11. The system of claim 10, wherein the control unit is configured to provide said one or more scanner settings to the scanning device responsive to the analysis device indicating the presence of the scan parameter values.

12. The system of claim 1, wherein the scanner settings comprise at least one selected from the group including a scan mode of the image, a resolution, an initial position value, an image size, a color, and a brightness.

13. The system of claim 1 further comprising a document input mechanism adapted to receive one or more documents that include the scan images.

14. An apparatus, comprising:
an analysis device adapted to perform a scanning parameter analysis on one or more scan images to identify one or more scan parameter values included in at least a portion of said scan images and compare the identified scan parameter values to a library of scan parameter values to obtain scanner settings corresponding with the identified scan parameter values, wherein the portion of the scan images further includes an initial label and an end label and the one or more scan parameter values are included between the initial label and the end label; and
a control unit adapted to provide settings to a scanner for at least the portion of the scan images based at least in part on said scanning parameter analysis.

15. The apparatus of claim 14, further comprising a buffer.

16. The apparatus of claim 15, wherein the buffer is adapted to store the scan images prior to the a scanning parameter analysis.

17. The apparatus of claim 15, wherein the buffer is adapted to store the identified scan parameter values.

18. The apparatus of claim 14, wherein the control unit and the analysis device are electrically coupled to a host system.

19. The apparatus of claim 14, wherein the control unit comprises a central processing unit.

20. The apparatus of claim 14, wherein the initial label, the end label and the one or more scan parameter values include text.

21. The apparatus of claim 14, wherein the analysis device is further adapted to determine whether a particular scan image includes the scan parameter values and is adapted to indicate the presence of the scan parameter values to the control unit.

22. The apparatus of claim 14, wherein the scanner is controlled automatically and responsive to identifying the scanning parameter values.

23. The apparatus of claim 14, wherein the scanner settings comprise at least one selected from the group including a scan mode of the image, a resolution, an initial position value, an image size, a color, and a brightness.

24. The apparatus of claim 14, further comprising an image input device.

25. A method of operating a scanner, comprising:
determining whether an image of a document includes a scan format indication;
wherein the scan format indication includes an initial label and an end label;
if the image does include the scan format indication, comparing said scan format indication to a library of scan format indications to obtain scanner settings corresponding with said included scan format indication; and
scanning the document in accordance with the obtained scanner settings.

26. The method of claim 25, further comprising scanning the document in accordance with preset scanner settings if the image does not include the scan format indication.

27. The method of claim 25, further comprising scanning the document in accordance with scanner settings associated with a previous image if the image does not include the scan format indication.

28. The method of claim 25, wherein the initial label and the end label are represented by text characters.

29. The method of claim 25, wherein the scan format indication includes text characters positioned between the labels.

30. The method of claim 25, wherein the scanner settings comprise at least one selected from the group including a scan mode, a resolution, an initial position value, an image size, a color, and a brightness.

* * * * *

UNITED STATES PATENT AND TRADEMARK OFFICE
CERTIFICATE OF CORRECTION

PATENT NO. : 7,403,313 B2
APPLICATION NO. : 09/967715
DATED : July 22, 2008
INVENTOR(S) : Kuo It is certified that error appears in the above-identified patent and that said Letters Patent is hereby corrected as shown below:

At column 7, line 11, please replace "with to the" with --with the--.
At column 7, line 53, please replace "to the a scanning" with --to the scanning--.
At column 8, line 17, please replace "scanning parameter values" with --scan parameter values--.

Signed and Sealed this

Eleventh Day of August, 2009

David J. Kappos
*Director of the United States Patent and Trademark Office*